United States Patent
Klein (10) Patent No.: US 8,913,557 B2
(45) Date of Patent: Dec. 16, 2014

(54) DISTRIBUTED WIRELESS EXTENDERS OVER HOME MOCA BACKBONE

(75) Inventor: Philippe Klein, Jerusalem (IL)

(73) Assignee: Broadcom Corporation, Irvine, CA (US)

( * ) Notice: Subject to any disclaimer, the term of this patent is extended or adjusted under 35 U.S.C. 154(b) by 64 days.

(21) Appl. No.: 13/534,167

(22) Filed: Jun. 27, 2012

(65) Prior Publication Data

US 2014/0003331 A1    Jan. 2, 2014

(51) Int. Cl.
    *H04W 92/12*      (2009.01)

(52) U.S. Cl.
    USPC ............................. 370/328; 370/315

(58) Field of Classification Search
    CPC ............................. H04W 88/02; H04W 92/12
    USPC .................. 370/328, 401, 464, 469
    See application file for complete search history.

(56) References Cited

U.S. PATENT DOCUMENTS

| | | | | |
|---|---|---|---|---|
| 7,539,169 | B1 * | 5/2009 | O'Hara et al. ................ | 370/338 |
| 8,315,266 | B1 * | 11/2012 | Lam et al. ..................... | 370/401 |
| 8,570,917 | B2 * | 10/2013 | Okuda ........................... | 370/293 |
| 2006/0173978 | A1 * | 8/2006 | Palm et al. .................... | 709/220 |
| 2008/0037484 | A1 * | 2/2008 | Sugiura ......................... | 370/338 |
| 2008/0043637 | A1 * | 2/2008 | Rahman ......................... | 370/254 |
| 2008/0080414 | A1 * | 4/2008 | Thubert et al. ................. | 370/328 |
| 2008/0089305 | A1 * | 4/2008 | Yao et al. ...................... | 370/342 |
| 2009/0067441 | A1 * | 3/2009 | Ansari et al. .................. | 370/401 |
| 2011/0274029 | A1 * | 11/2011 | Connelly et al. .............. | 370/315 |
| 2012/0093068 | A1 * | 4/2012 | Okuda ........................... | 370/315 |
| 2012/0170558 | A1 | 7/2012 | Forbes et al. | |

OTHER PUBLICATIONS

Calhoun, et al, Lightweight Access Point Protocol, IETF, Feb. 2010, 125 pgs.
Calhoun, et al, Control and Provisioning of Wireless Access Pints (CAPWAP) Protocol Specification, IETF, Mar. 2009, 155 pgs.

\* cited by examiner

*Primary Examiner* — Edan Orgad
*Assistant Examiner* — Emmanuel Maglo
(74) *Attorney, Agent, or Firm* — Garlick & Markison; Bruce E. Garlick (57) ABSTRACT

A technique to provide distributed wireless extenders over a MoCA specified coaxial cable backbone, in which the extenders function as wireless connection points on a network. The wireless extenders operate with a central access point controller that functions as the access point for the network, in which the extenders provide a plurality of wireless connection points for devices attempting to access the network. In one scheme, the MoCA backbone is used to transfer multimedia data using protocols such as LWAPP and CAPWAP.

20 Claims, 6 Drawing Sheets

DISTRIBUTED WIRELESS EXTENDERS OVER HOME MOCA BACKBONE

BACKGROUND OF THE INVENTION

1. Technical Field of the Invention

The embodiments of the invention relate to communication systems and, more particularly, to systems implementing multimedia over coax.

2. Description of Related Art

In today's highly technology oriented environment, wireless communication devices and networks are being implemented in various applications and environments. For example, in a typical home setup, an access point device is connected to a wired backbone to communicate wirelessly with one or more devices, which are generally termed as stations. Station devices include, but are not limited to, laptop or note book computers, tablet computers, telephones (e.g. smart-phones), printers, displays, cameras, speakers, headphones, microphones, game consoles and peripherals, etc. In order to communicate within the network, the access point (such as a router) operates as the central controlling mechanism for the various stations and manages the wireless traffic in the network. The network may be further complicated when these station devices set up their own peer-to-peer communications or piconets, such as Bluetooth™ connections.

When the traffic level increases, a single access point network may be overburdened and bandwidth may be constrained. The limited bandwidth may present a challenge when high data rate traffic, such as streaming video, is being routed wirelessly between/among the devices in the network. With certain traffic, a slight delay in data flow or interruptions have minimal impact for the user. However, with certain other traffic, any interruption or delay may impact the user's enjoyment. For example, for ultimate enjoyment, it is generally desirable not to have interruptions of a movie being viewed by a user. Accordingly, with various high data rate transmissions, a Quality of Service (QoS) requirements are being established for data transfer, in order to obtain and maintain user enjoyment.

One mechanism for increasing wireless traffic is to employ multiple access points. Having multiple access points in a home, work environment, or any other location, permit various devices to connect to the network through multiple locations. Further, when the access points are distributed throughout the network at different physical locations of the network, a mobile station may obtain access through one access point at a first location, move from one location to another location and obtain access at the second location via a second access point. Such arrangement allows a mobile station to move from one location to a second location and still maintain access to the network.

When independent access points are utilized in a network at multiple locations, each access point operates as an independent agent on the network. This arrangement requires a station to perform a complete association routine each time a station attempts to connect to a different access point. Not only does this procedure require additional time for the establishment of the connection between the station and the new access point, which could interrupt traffic flow, but the cost of placing fully independent access points at multiple locations may escalate equipment cost.

In order to reduce costs, but maintain an acceptable QoS requirement for a multiple access point network, the communication industry has started a move toward the establishment of lightweight access points (LWAPs or LAPs). A LWAP or LAP is an access points that does not operate on its own and require a separate controller. When multiple LAPs are utilized on a network, each LAP communicates with a central controller on the network and each LAP is controlled by the central controller. Protocols, such as Lightweight Access Point Protocol (LWAPP) and Control and Provisioning of Wireless Access Point Protocol (CAPWAP) are being defined by the Internet Engineering Task Force (IETF) for implementation with lightweight access points, typically within an enterprise environment.

However, the LAPs, along with the protocols, are defined for use on a wired local access network (LAN) backbone. A typical wired LAN network is an Ethernet LAN and the backbone is comprised of multiple wires. In a typical home network, LAN wires are distributed to various rooms in a house and various connections may be established at the line terminations. It is envisioned that lightweight access points may be connected to these wired LAN terminations.

Although a wired LAN can provide a backbone in many home applications, the physical properties of the wires present certain limitations on the signal frequency and bandwidth that may be obtained from the wired LAN network. In order to obtain higher frequency traffic flow, the embodiments of the invention implement the concept of lightweight access points using a cable network, since many home environments also have already installed coaxial cables for viewing of television signals from cable and/or on-demand service providers.

DETAILED DESCRIPTION OF THE INVENTION

The embodiments of the present invention may be practiced in a variety of cable networks to transfer multimedia data between a gateway and a plurality of wireless termination points that operate equivalently to lightweight access points. The termination points wirelessly communicate with various stationary and/or mobile wireless stations. The cable network described herein pertain to coaxial cables that support the transfer of multimedia data utilizing a particular standard, such as the cable networking standard specified by the Multimedia over Cable Alliance (MoCA™). However, the data transfer need not be limited to multimedia data and other standards different from a standard specified by MoCA may be utilized. Although the typical practice for home cabling is the use of coax cables, other forms of cable may be used in different embodiments. Likewise, a home network is described below, but it is to be noted that other than home networks may implement the invention. Furthermore, two known lightweight access point protocols, LWAPP and CAPWAP are described below; however, other protocols may be used in other embodiments to provide the communication linkage between an access point controller and the wireless termination points. Similarly, different hardware may be implemented in other embodiments and the hardware applications are not limited those described herein.

Figure 1:
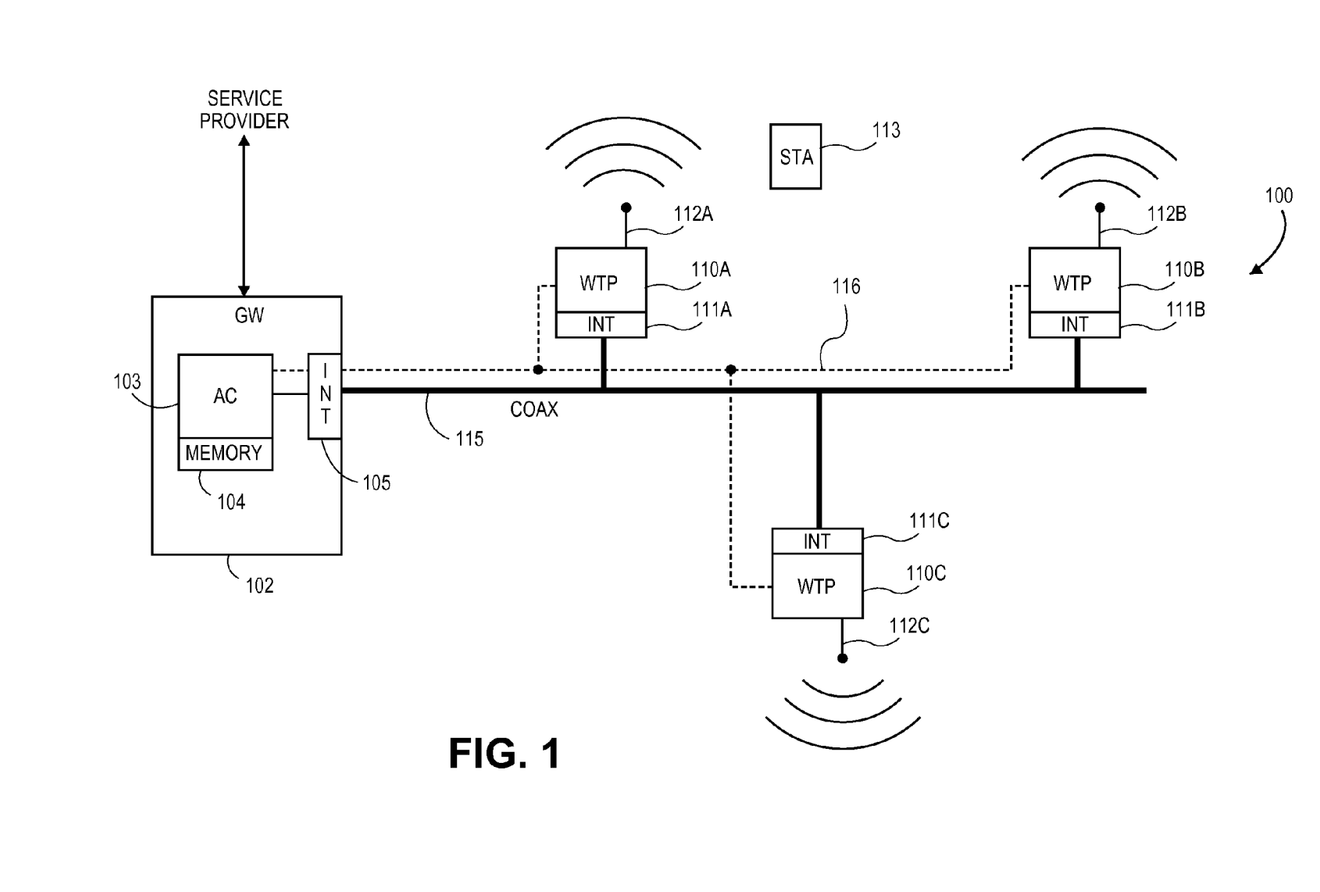
FIG. 1 is a schematic block diagram showing a gateway that couples to a coaxial cable, in which the coaxial cable is used as a backbone to support a plurality of wireless termination points under control of an access point controller to provide a distributed wireless communication network in accordance with one embodiment for practicing the present invention.

FIG. 1 shows a system 100 having a conductive cable 115 coupled to a gateway (GW) 102 via an interface 105. Cable 115 may be one of a variety of cables used for conducting electrical signals. In one embodiment, cable 115 is a coaxial cable, such as a coaxial cable (coax) used to conduct television signals in a typical home. For example, coax 115 may be a coax having designations, such as RG-8, RG-9, RG-58, RG-59, etc. GW 102 may be of a variety of gateways that are used to couple to a service provider. For example, a service provider may be a cable television provider, a satellite provider, an independent service provider (ISP) for Internet connections, an on-demand service provider, a broadcast provider, etc., or a combination thereof. Gateways that couple to such service providers include, but are not limited to, modems, set-top boxes, converter boxes, servers, etc. Accordingly, GW 102 may be any of a variety of gateway devices that couple to one or more source or service provider(s). One purpose of GW 102 is to operate as an intermediary interface for transferring signals between coax 115 and a service provider or providers coupled to GW 102.

Although a variety of techniques may be used to transmit signals on coax 115, in one embodiment, signals are transmitted on coax 115 using a standard established by the Multimedia over Cable Alliance (MoCA). Protocols based on the MoCA specification support multiple streams of High Definition (HD) video, deliver minimum of 400 Mbps of data throughput and up into the low gigahertz range (1 GHz and above), have low error rates in the range of $10^{-6}$ to $10^{-8}$, and offer an unparalleled Quality of Service (QoS). When utilizing a MoCA specification, multimedia signals may be transmitted over coax 115 using superior data throughput than over powerline or phoneline wired LAN.

A number of extenders, referred to herein as wireless termination points (WTPs), are shown coupled to coax 115 via WTP interface 105. Three WTPs 110A, 110B and 110C are shown in FIG. 1 coupled to coax 115 via respective termination interfaces 111A-C. However, it is to be noted that the actual number of WTPs may vary from system to system. Furthermore, WTPs may be added to or removed from coax 115, as system requirements change. Each WTP 110A-C has an antenna, or a plurality of antennas, (shown respectively as antennas 112A-112C) to provide wireless transmission and reception when wirelessly communicating with a station (STA), such as STA 113. Stations may be fixed or mobile stations. As shown in FIG. 1, coax 115 forms a cable backbone for system 100. Thus, although one cable is shown, coax 115 may be comprised of multiple cables. Thus, in the shown example, WTP 110A-C may be coupled to a single coax, or each WTP 110A-C may be coupled to GW 102 via separate coax, or a combination thereof. However, for simplicity of explanation, only one coax cable is illustrated in the Figures.

The WTPs 110A-C terminate onto coax 115, via termination interfaces 111A-C, and operate as a distributed wireless extenders over the MoCA backbone of coax 115 to provide wireless access locations for stations, such as STA 113, to access the MoCA backbone. That is, WTPs 110A-C perform the functions of an access point connection to wirelessly communicate with STA 113. However, WTPs 110A-C are not fully independent access points and do not operate as such. Rather, WTPs 110A-C only operate in conjunction with a controller that provides certain management functions for the plurality of WTPs 110A-C coupled to coax 115. Thus, WTPs 110A-C operate equivalently to the afore-mentioned lightweight access points, in that a controller is utilized to provide certain operational functions of WTPs 110A-C.

As shown in FIG. 1, an access point controller (AC) 103 is used to provide the controller function for WTPs 110A-C. AC 103 typically has an associated memory 104 that performs the function of a cache memory for storing data for distribution to one or more WTPs on coax 115. The multiple WTPs 110A-C are coupled to AC 103 and operate under control of AC 103 to provide a wireless access point connection at each WTP location. However, since all of the WTPs are under direction of AC 103, all of the WTPs operate as one virtual access point of AC 103. That is, AC 103 provides the central access point function that may be wirelessly accessed at the various extended locations populated by WTPs 110A-C along coax 115. The single virtual access point function is illustrated by dashed line 116. Examples of how AC 103 communicates with each of the WTPs are described below in reference to the embodiments shown in FIGS. 3 and 4.

Figure 2:
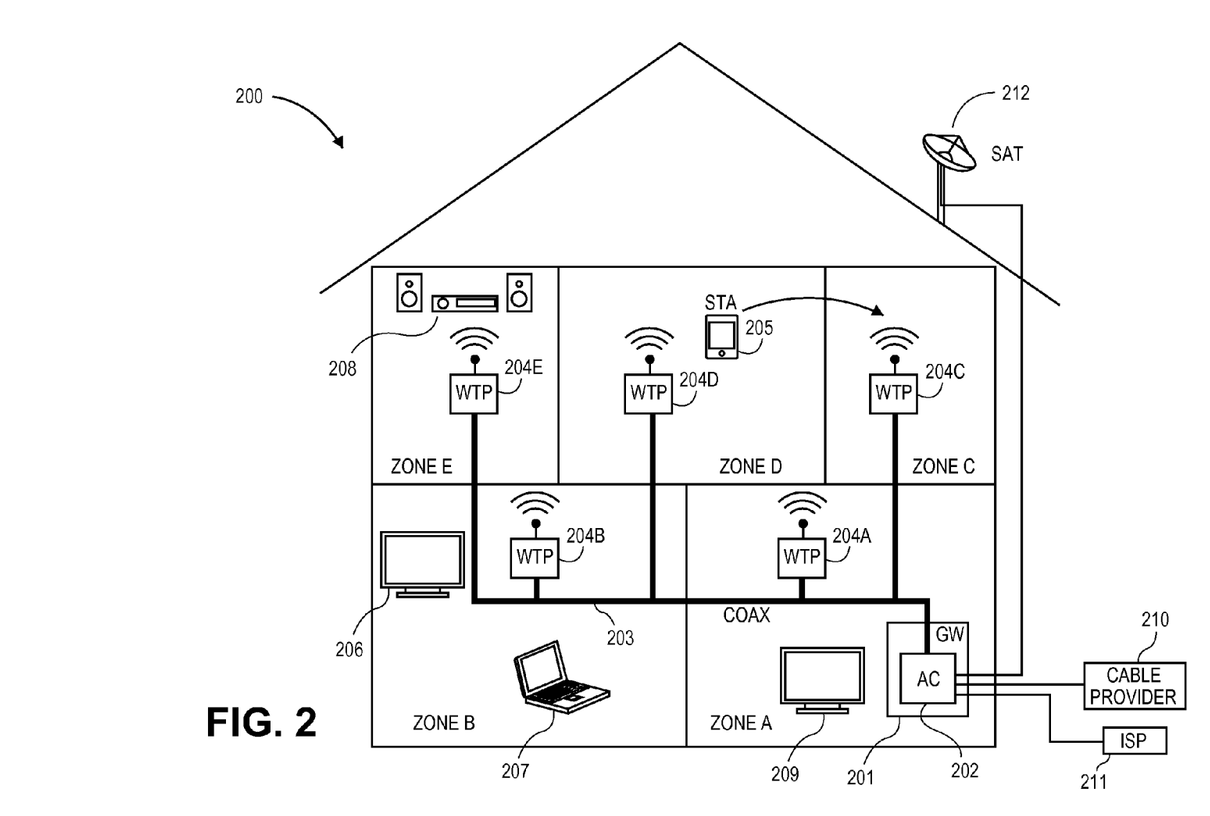
FIG. 2 is a schematic block diagram showing an implementation of a home multimedia network utilizing a coaxial cable backbone and a plurality of wireless termination points distributed throughout the home and under control of an access point controller in a gateway in accordance with one embodiment for practicing the present invention.

FIG. 2 shows a home environment in which a variation of the system of FIG. 1 is implemented. In FIG. 2, a home system 200 is shown having a coaxial cable MoCA backbone 203 distributed throughout the home. Coax 203 is coupled to a gateway 201, that includes AC 202. WTP or extenders 204 are distributed along coax 203 to provide wireless connection points at different locations throughout the house. Five WTPs 204A-E are shown providing wireless access points at different locations of the house. Each WTP 204 provides wireless coverage over a respective zone A-E, which may be different rooms of the home. Although the shown zone coverage is separately distinct in FIG. 2, in many instances, the wireless coverage from WTPs 204 may overlap two or more zones. As shown, GW 201 may couple to a satellite provider 212, a cable provider 210, and/or an ISP 211. It is to be noted that the service connection to GW 201 need not be limited to the three service providers shown.

As described above in reference to FIG. 1, the MoCA backbone may be comprised of only one coax cable or each WTP 204A-E may be coupled to AC 202 using separate coax cables, or a combination thereof. In the shown example embodiment, a mobile station device, STA 205 (e.g. mobile phone, audio/video player, tablet computer, etc.), is located in zone D having wireless access to coax 203 via WTP 204D. Subsequently, when STA 205 moves to a different zone, such as Zone C, STA 205 then establishes a communication link with the WTP for that zone, which is WTP 204C of Zone C in the example. As will be described below, since AC 202 operates functionally as the central access point for the coax backbone, each WTP 204A-E operates as a wireless connection point to AC 202 along coax 203. In addition, other example station devices (STAs) are shown. Television displays 206 and 209, notebook computer 207 and stereo audio player 208 are examples shown in FIG. 2. It is to be noted that theses devices are presented as examples and other devices may comprise STAs in other embodiments.

With system 100 and system 200 of FIGS. 1 and 2, the WTPs operate as wireless extenders to the AC. For example WTPs 204A-E of home system 200 operate with AC 202. WTPs 204A-E are equivalent to lightweight access points in that a wireless access connection is available at the location of the particular WTP. However, AC 202 operates as the central access point on coax 203 and AC 202 provides the management for WTPs 204A-E. The Media Access Control (MAC) address utilized with a typical access point is associated with AC 202 and this MAC address is also used with WTPs 204A-E. In some embodiment, sub-MAC addressing may be associated with the WTPs, but the upper MAC functions are relegated to the functions of AC 202. AC 202 then manages the timing and scheduling of communications with each WTP that is associated with AC 202. The central management functions provided by AC 202 also pertain to authentication and data security when a station, such as STA 205, attempts to establish a link with AC 202 through one of the WTPs.

For example, when STA 205 attempts to establish a wireless communication link with WTP 204D in Zone D, a typical authentication and association is performed between STA 205 and AC 202 via WTP 204D. After association, STA 205 and AC 202 communicate via WTP 204D to transfer data, such as multimedia data. When STA 205 moves to another zone, such as Zone C, STA 205 may now communicate with AC 202 via WTP 204C of Zone C. Because the association is between STA 205 and AC 202, STA 205 does not need to undergo another authentication and association session with WTP 204C, even though the wireless link is now with a new WTP. For example, a secure key established between AC 202 and STA 205 may be shared by WTPs 204A-E. The virtual access point environment provided by AC 202 through the plurality of WTPs allow STA 205 to move the wireless communication link from one WTP to another WTP without re-association and re-authentication. This seamless handover from one WTP to another WTP allows for continuous multimedia data feed to STA 205 through multiple WTPs, provided that the WTPs are coupled to the same AC.

Furthermore, because AC 202 provides the upper level access point functions, hardware and code pertaining to those functions may reside with AC 202. WTPs 204A-E would then only retain hardware and code for those lower level functions required for establishing the communication link with STA 205. Likewise, bulk of the cache memory (such as memory 104 in FIG. 1) may be retained with the AC instead of at each WTP. For example, multimedia data destined for STA 205 may be stored in a cache at AC 202 until a connection is established with STA 205 through one of the WTPs, such as WTP 204D. Once established, multimedia data may be streamed to WTP 204D for transmission to STA 205. It is to be noted that some memory may be present in WTP 204D to buffer data, but the amount of memory required is substantially less than caching all of the destined multimedia data. Then when STA 205 moves to Zone C, AC 202 may then send the multimedia data from its cache to WTP 204C for transmission to STA 205. This distributed arrangement of WTPs reduces code duplication in the WTPs and may reduce power consumption as well, due to less hardware or functions required.

Figure 3:
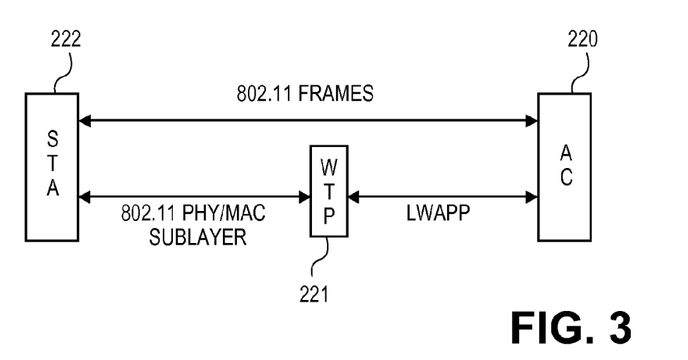
FIG. 3 is a diagram showing one example implementation of a communication link between an access point controller, wireless termination point and a station when using Lightweight Access Point Protocol to provide the control linkage for multimedia frame transfer in accordance with one embodiment for practicing the present invention.

It is appreciated that a variety of protocols may be implemented for providing the connection between AC 202 and WTPs 204A-E, as well as the wireless connection between STA 205 and the WTPs. In one embodiment, as shown in FIG. 3, Lightweight Access Point Protocol (LWAPP) defined by the Internet Engineering Task Force (IETF) is utilized as the protocol between AC 220 and WTP 221. LWAPP is a generic protocol having formats for both MAC-level (layer 2) transport and Internet Protocol (IP)-level (layer 3) transport. The LWAPP Transport layer carries two types of payload, control messages and data messages. LWAPP data messages are forwarded wireless frames, while LWAPP control messages are management messages exchanged between a WTP and an AC.

LWAPP begins with a discovery phase, in which WTPs send a Discovery Request frame, causing any AC receiving that frame to respond with a Discovery Response. From the Discovery Responses received, a particular WTP (e.g. WTP 221) selects an AC with which to associate, using the Join Request and Join Response. The Join Request also provides a mechanism to determine whether there is support for the transport of large frames between the WTP and the AC. If support for large frames does not exist, LWAPP frames are fragmented to the maximum length discovered to be supported by the network. Once the WTP and the AC have joined, a configuration exchange occurs that causes both devices to agree on a version, establish security authentication and the WTP may receive provisioning settings, including security parameters, data rates, radio channel (channels, if the WTP is capable of operating more than one channel).

A separate wireless protocol is then used to provide the wireless communication protocol between WTP 221 and STA 222. In the particular example shown, this communication link is established using IEEE 802.11 protocol to provide the PHY/MAC sublayer between WTP 221 and STA 222. Once established, 802.11 frames are transferred from AC 220 to STA 222 via WTP 221. One example of 802.11 communication using versions of 802.11a/b/g/n/ad is WiFi.

Accordingly, the example of FIG. 3 is applicable to 802.11 specific control frames that are transparently transported over the AC-WTP coax in MoCA frames.

Figure 4:
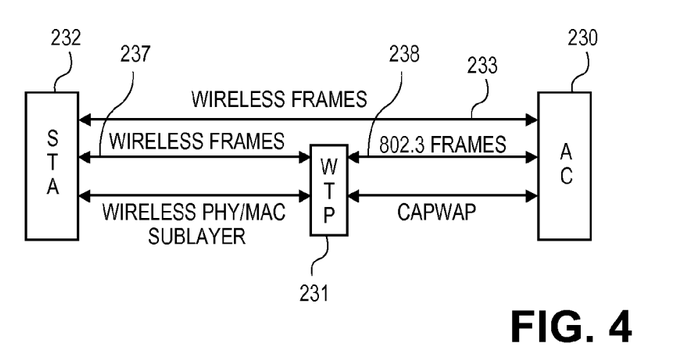
FIG. 4 is a diagram showing one example implementation of a communication link between an access point controller, wireless termination point and a station when using Control and Provisioning of Wireless Access Point Protocol to provide the control linkage for multimedia frame transfer in accordance with one embodiment for practicing the present invention.

In another embodiment shown in FIG. 4, Control and Provisioning of Wireless Access Point Protocol (CAPWAP) defined by IETF is utilized as the protocol between AC 230 and WTP 231. CAPWAP protocol is a generic protocol defining AC and WTP control and data communication, similar to LWAPP, via a CAPWAP transport mechanism. CAPWAP control messages, and optionally CAPWAP data messages, are secured using Datagram Transport Layer Security (DTLS), which is also an IETF protocol. As shown in FIG. 4, CAPWAP data messages are encapsulated and forwarded as wireless frames between AC 230 and STA 232 via WTP 231. CAPWAP control messages are management messages exchanged between WTP 231 and AC 230. CAPWAP data and control packets are sent over separate ports. Since both data and control packets may exceed a Maximum Transmission Unit (MTU) length, the payload of a CAPWAP data or control message may be fragmented.

CAPWAP begins with a Discovery phase. WTPs send a Discovery Request message, causing any AC receiving the message to respond with a Discovery Response message. From the Discovery Response messages received, a particular WTP (e.g. WTP 231) selects an AC with which to establish a secure DTLS session. CAPWAP messages may be fragmented to the maximum length supported by the network. Once WTP 231 and AC 230 have completed DTLS session establishment, a provision exchange occurs in which both devices agree on a version establish security authentication and WTP 231 may receive provisioning settings.

When WTP 231 and AC 230 have completed the version and provision exchange and WTP 231 is enabled, CAPWAP is used to encapsulate the wireless data frames sent between the WTP 231 and AC 230. When fragmented, fragmented CAPWAP packets are reassembled to reconstitute the original encapsulated payload. CAPWAP may support two modes of operation, Split and Local MAC modes. In Split MAC mode, all Layer 2 wireless data and management frames are encapsulated via CAPWAP and exchanged between WTP 231 and AC 230. The wireless frames 233 received from STA 232 are directly encapsulated by WTP 231 and forwarded to AC 230.

In the Local MAC mode of operation, wireless data frames between STA 232 and WTP 231 are processed locally by WTP 231 and locally bridged or tunneled (such as 802.3 frames) as frames 238 to AC 230. In either event, WTP 231 processes frames between AC 230 and STA 232. FIG. 4 shows the particular example that establishes a PHY/MAC sublayer between WTP 231 and STA 232 and CAPWAP between WTP 231 and AC 230. The split mode is shown using frames 233 and the Local MAC mode is shown using frames 237 between STA 237 and WTP 231 and frames 238 between WTP 231 and AC 230. The particular Local MAC shown shows encapsulation of wireless frames in an 802.3 frame between WTP 231 and AC 230.

Accordingly, the example of FIG. 4 is applicable to Ethernet data traffic that are transported over the AC-WTP coax in MoCA Ethernet data frames. It is to be noted that FIGS. 3 and 4 show just two example protocol schemes for communicating different types of frames between an AC and a STA via a WTP. Other schemes may be implemented as well between the AC, WTP and STA.

Figure 5:
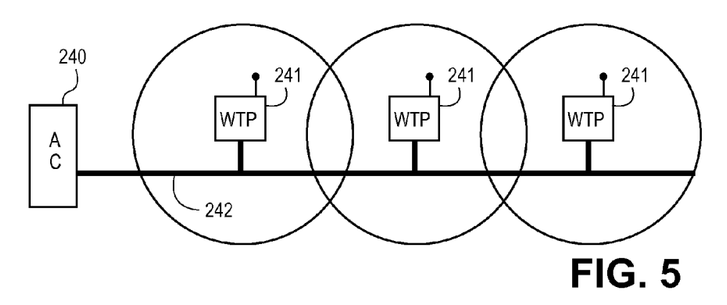
FIG. 5 is a diagram showing a power generation at each wireless termination point when the wireless termination point are spaced at a designated distance in accordance with one embodiment for practicing the present invention.

It is to be noted that how the WTPs are distributed is determined by the particular system being implemented and the location of the coax backbone. As shown in FIG. 2, one particular implementation is within a home to distribute multimedia data to various locations throughout the home and devices are that are fixed or mobile within the home. The WTPs may be located and configured to provide regions of coverage. Accordingly, FIG. 5 shows an AC 240 coupled to a coax backbone 242 in which three WTPs 241 are distributed at various locations. By controlling the power being emanated, the coverage area may be adjusted. The three WTPs 241 have appropriate power emanations so that vacant coverage areas are not present. The example of FIG. 5 shows a linear distribution of the WTPs 241 for illustrative purpose, but it is to be noted coverage areas may be planar or three-dimensional. With adequate coverage, a mobile device may transition from one WTP to another WTP without loss of wireless connection to AC 240.

Figure 6:
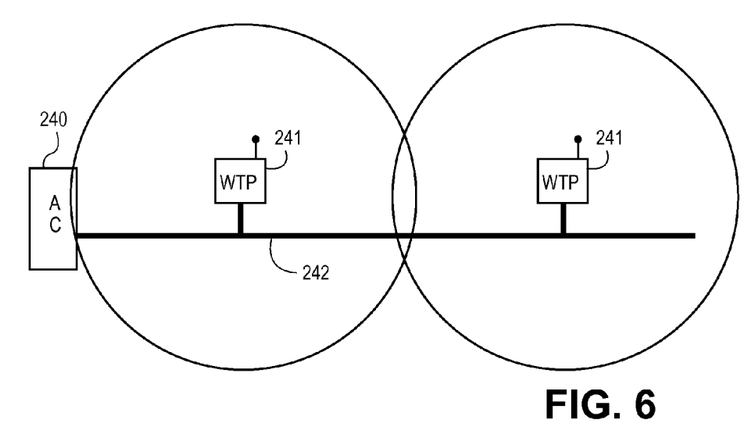
FIG. 6 is a diagram showing a power generation at each wireless termination point when the wireless termination point are spaced at a designated distance that is farther apart than the distance shown in FIG. 5 in accordance with one embodiment for practicing the present invention.

When the WTPs are distributed farther apart, the power emanations from WTPs may be increased to increase the coverage area. Thus, as shown in FIG. 6, AC 240 may increase the WTPs power when the WTPs are farther apart in order to maintain adequate coverage throughout an area, such as a home. Since AC 240 controls all of the WTPs under its control, AC 240 may make the necessary power adjustments. The amount of coverage overlap may also be controlled by AC 240 by adjusting the power. Furthermore, this power adjustment capability allows the system to be modular. Hence, new WTP devices may be added or existing WTP devices removed or relocated along coax backbone 242. AC 240 then may provide the power adjustments as required to ensure that the desired coverage is obtained.

In addition, in one embodiment, the WTPs may also operate on different channels (e.g. different frequencies) so that one WTP zone does not interfere with another. However, since the AC is controlling the channel selection for each WTP, seamless travel of a STA from one WTP zone to another WTP zone may still be achieved. When transitioning to adjacent zones, the AC informs the STA of the channel changing when entering the next zone. Other schemes may be used as well to ensure a seamless channel change for a STA moving from one WTP zone to another.

Figure 7:
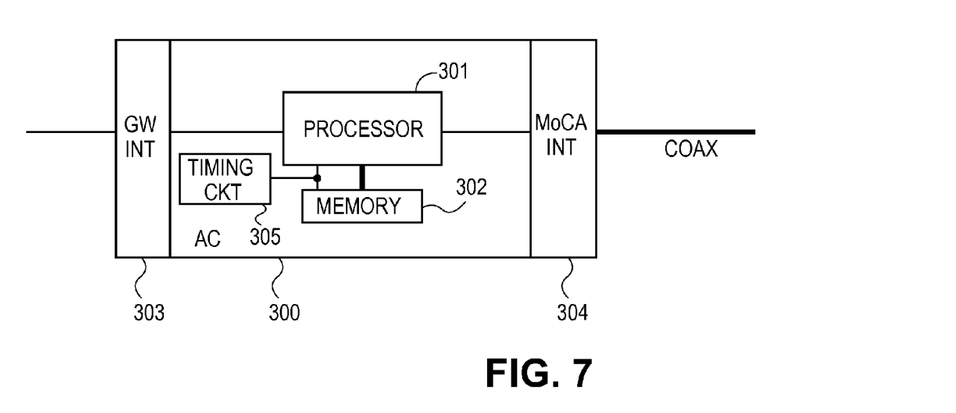
FIG. 7 is a schematic diagram of an access point controller in accordance with one embodiment for practicing the present invention.
Figure 8:
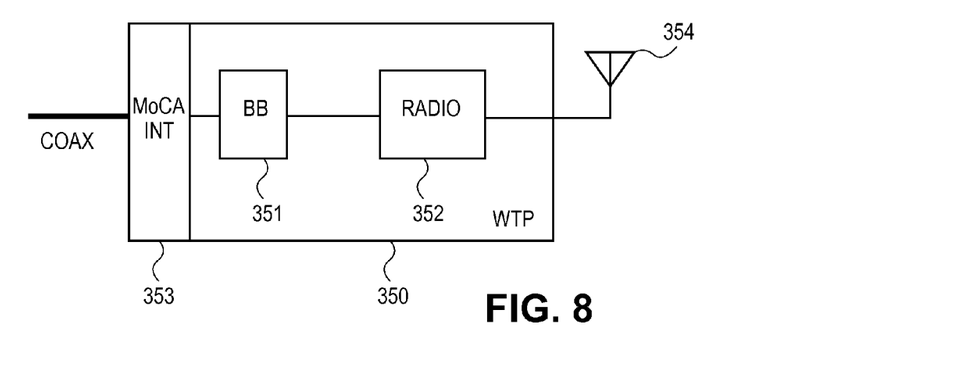
FIG. 8 is a schematic diagram of a wireless termination point in accordance with one embodiment for practicing the present invention.

Although a variety of hardware devices may be implemented for an AC and a WTP to practice the invention, FIG. 7 shows one device or apparatus for implementing an AC and FIG. 8 shows one device or apparatus for implementing a WTP. AC 300 of FIG. 7 includes a processor 301, memory 302 gateway interface 303, MoCA interface 304 and timing circuit 305. It is to be noted that other components may be present within device 300 as well. Gateway interface 303 provides the interface coupling to one or more sources of data, such as the providers discussed above in reference to FIGS. 1 and 2. Multimedia data, such as streaming video from a service provider, is provided to AC 300 via interface 303. Alternatively, MoCA interface 304 couples to one or more coaxial cable(s). Processor 301 provides the processing and scheduling functions as described above in controlling the plurality of WTPs coupled to the coax and transferring the data to one or more WTPs for wireless transmission to a STA device. Memory 302 provides storage, whether for storing data or program instructions. As noted above, memory 302 may provide the cache function for the data. Processor 301 may also receive input from a STA via one or more WTPs for transmission out of gateway interface 303.

Timing circuit 305 of AC 300 provides the timing synchronization of the WTPs coupled to AC 300. As noted above, the WTPs operate under control of AC 300 and the timing provided by timing circuit 305. By utilizing a common timing source, the timing and, hence, the operation of each WTP coupled to AC 300 may be controlled/That is, timing circuit 305 provides timing synchronization in controlling the functions of the various WTPs.

In some embodiments, the timing function provided by timing circuit 305 may be provided by an external source. Still in other embodiments, the timing may be obtained from the same timing source that provides timing synchronization utilized with MoCA applications on transferring signals on cable. What is to be noted is that the timing clock signals may be obtained from a variety of timing or clock sources and AC 300 uses the timing or clock signals to synchronize the operations of the WTPs under control of AC 300.

Furthermore, it is to be noted that AC 300 may be constructed using multiple components in some instances. However, in one embodiment, AC 300 is formed as a stand-alone integrated circuit or as part of a larger integrated circuit containing other components and circuitry.

In FIG. 8, WTP 350 includes a baseband (BB) module or processor 351, radio 352, MoCA interface 353 and antenna 354. It is to be noted that other components may be present within device 350 as well. For example, a memory may be present to buffer data for transfer in and out of WTP 350. However, as noted above, typically, less memory storage size is maintained, since an AC provides the main data caching function. MoCA interface 353 provides the interface coupling to a coaxial cable, which couples to an AC, such as AC 300. BB 351 provides the processing functions as described above in controlling the intermediary function of transferring frames between an AC and a STA coupled to WTP 350. BB 351 also provides digital processing of signals to and from radio 352. Accordingly, in one embodiment BB 351 may be a digital signal processor (DSP). Radio 352 provides digital-to-analog conversion, modulation and transmission for wireless transmission of signals to a STA. Radio 352 also provides reception, detection, analog-to-digital conversion and baseband processing of signals received from a STA. Accordingly, radio 352 includes one or more transceivers (transmitter and receiver) to perform these functions. Radio 352 is coupled to one or more antenna(s) for transmission and/or reception. It is to be noted that BB 351 and radio 352 may have capabilities for performing multiple-input, multiple-output (MIMO) operations using a plurality of antennas. Furthermore, radio 352 may employ omni-directional antennas, such as for 2.4-5 GHz operations. Alternatively, radio 352 may employ directional antennas, such as for 60 GHz operations.

Furthermore, it is to be noted that WTP 350 may be constructed using multiple components in some instances. However, in one embodiment, WTP 350 is formed as a stand-alone integrated circuit or as part of a larger integrated circuit containing other components. Antenna 354 may be a separate antenna or may be integrated on the same integrated circuit as WTP 350.

Figure 9:
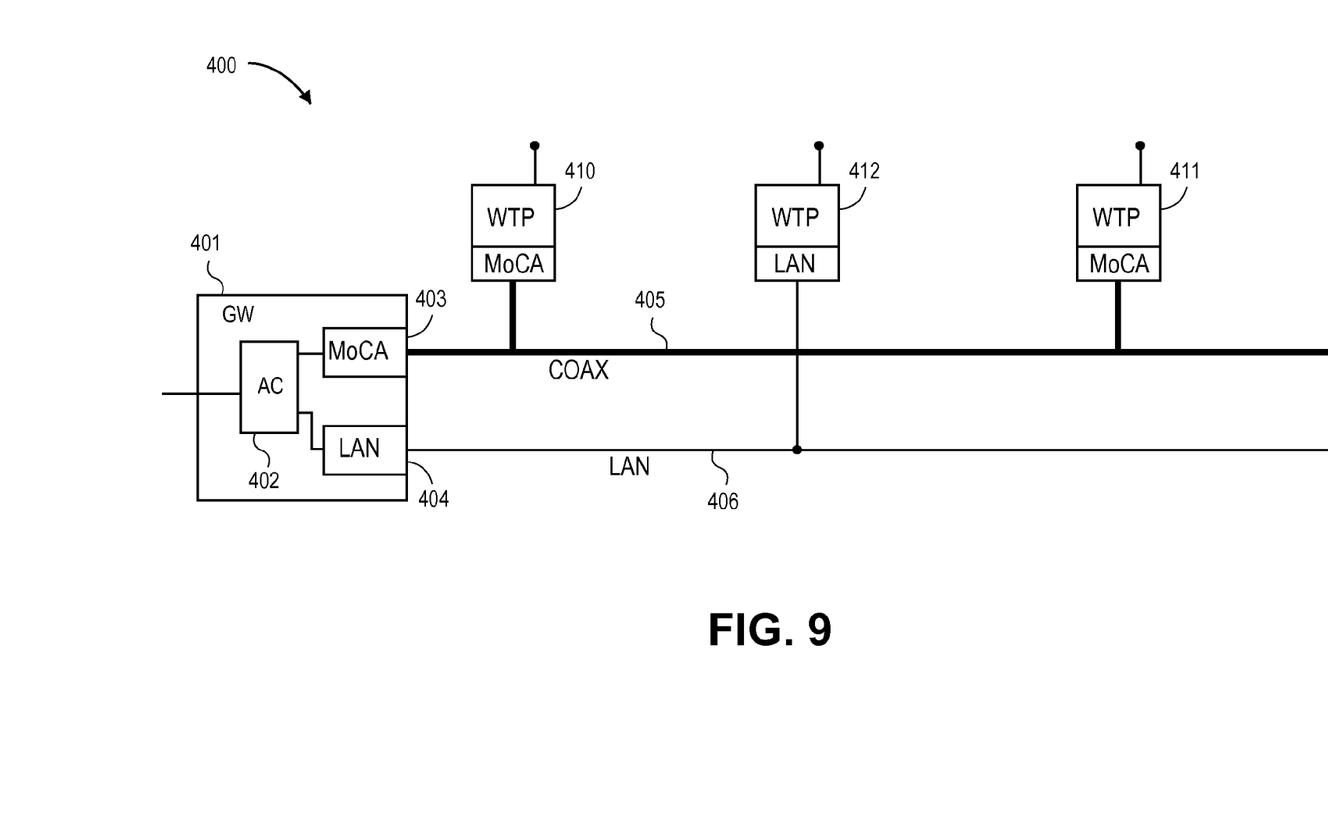
FIG. 9 is a schematic block diagram showing a coaxial cable network that operates in conjunction with a wired local area network to provide a hybrid distributed wireless termination points for a multimedia communication network in accordance with one embodiment for practicing the present invention.

FIG. 9 shows an alternative embodiment for practicing the invention. In FIG. 9, a system 400 is shown in which an AC 402 resides as part of gateway 401. AC 402 is coupled to a coax backbone 405 via a MoCA interface 403. A plurality of WTPs are coupled to coax backbone 405. Only two WTPs 410 and 411 are shown coupled to coax backbone 405 in FIG. 9. WTPs 410, 411 utilize specifications established under MoCA to transfer data between the WTPs and AC 402 in the manner described above to provide distributed extenders for AC 402 on coax backbone 405 and by utilizing the various protocols also described above.

A second backbone 406 is shown also coupled to AC 402 via interface 404. In the example of FIG. 9, the second backbone is a LAN backbone, such as an Ethernet backbone. One or more WTP's may reside on the LAN backbone. In the particular example of FIG. 9, one WTP 412 is coupled to the LAN backbone 406. In this instance, the WTPs on both backbones 405, 406 operate together as distributed access point extenders to provide wireless coverage. Although the two backbones do not interact with each other, same or similar protocols may be employed on the two backbones. For example, the above-described LWAPP and CAPWAP may be utilized by AC 402 to control WTP's on the two backbones. One advantage for a hybrid system of FIG. 9 employing multiple backbones is that AC 402 may obtain larger coverage by using multiple backbones. For example, there may be certain rooms, locations, etc., that does not contain a portion of coax backbone 405, so that a WTP termination would not be available. However, if that room or location contained a portion of LAN backbone 406, a WTP may be terminated to LAN backbone 406 at the particular location to operate with AC 402. Thus, a hybrid system using more than the one MoCA backbone may be advantageous in certain circumstances.

It is to be noted that the hybrid system may employ other backbones other than coax and LAN. For example, backbones utilizing power line technology, such as a powerline control system, may be employed instead of, or in addition to, LAN technology. Other types of backbone technologies may be used as well.

It is to be noted that a number of advantages may be derived from employing AC controlled WTPs on a coaxial cable. MoCA specifications allow 400-800 MHz signals on a coaxial cable with future specifications being envisioned into the gigahertz range. MoCA networks accept and bridge Ethernet packets and permit data transfers on cable on top of broadcast signals with minimal interference. MoCA utilizes coaxial cables with shielding for noise suppression and reduction of signal interference. Furthermore, MoCA specifications may be readily implemented in existing home cable network structures, since many homes already are wired for coax.

As noted above, the AC provides synchronous timing control to the various WTPs under its control. In one embodiment, MoCA specified specification, protocol or standard may be used over coax. Since MoCA employs a shared and synchronous network, the AC may synchronize the operation of the WTPs. Thus, AC 202 of FIG. 2 may provide a synchronized network with clock control of the traffic from AC 202 to WTPs 204A-E, and may control various functions of WTPs 204A-E, as well. For example, in reference to FIG. 2, AC 202 may stream High Definition (HD) video to both television displays 206 and 209, while transferring audio to stereo 208. The video stream to television display 209 is via WTP 204A and the video stream to television display 206 is via WTP 204B. The two video streams to the television displays may be different video streams. The audio to stereo 208 is via WTP 204E. Since AC 202 controls the various WTPs, AC 202 can schedule when the video stream transfer is made to WTP 204A and WTP 204B, as well as audio to WTP 204E.

In order to ensure minimal latency in the transfer of the video streams to the television displays to provide uninterrupted QoS service and viewing enjoyment, AC 202 schedules the delivery of video streams to WTP 204A and WTP 204B, as well as other data transfers (such as the audio to WTP 204E), to meet these requirements. AC202 may also control the beacon generation from each of the WTPs, so that STA response from various STA's on the network are spaced apart and not occur at conflicting times. Furthermore, since AC 202 controls the timing and operation of the WTPs, AC 202 is aware when WTP 204A and WTP 204B will make the multimedia and/or data transfer to its STAs. Accordingly, AC 202 may transmit the multimedia (data or whatever else) to the appropriate WTP just prior to the time for transfer from the WTP to the STA. By knowing and scheduling the timing of such data transfer between a WTP and its STA, a much smaller data buffer or cache may be employed within each WTP. As an example, if notebook computer 207 is also supported by WTP 204B, along with television display 206, WTP 204B may not necessarily need to buffer data destined to both devices at the same time. AC 202 may schedule data transfer to fill the memory buffer of WTP 204B for television display 206 just prior to having WTP 204B make the data transfer to television display 206 and may subsequently fill the memory buffer of WTP 204B for notebook computer 207 just prior to having WTP 204B make the data transfer to notebook computer 207. Thus, a smaller memory buffer (or cache) may be employed in each of the WTPs. Likewise some functional circuitry may not be necessary in each of the WTPs if those functions are provided by the AC. Smaller buffer/cache implementation and reduction of certain functional circuitry may reduce the cost of each WTP, thereby making home implementation more economical.

Thus, a scheme to provide distributed wireless extenders over a MoCA backbone is described. Although the various examples described herein pertain to a coaxial cable backbone operating using MoCA specifications, other cable specification may be used as well. Furthermore, the invention is not limited to coaxial cable backbones and may be adapted for use on other transmission lines. Likewise, the examples described pertain to a home network for the MoCA backbone, but the invention may be adapted for work, commercial and/or outdoor environments as well. The examples herein placed the emphasis on distributing multimedia to various stations that connect to the WTPS. However, the invention is applicable to all forms data and not just to multimedia.

It is to be noted that further advantages may be derived by the practice of the invention. Some of these advantages that may be derived are:

Reduced and optimized power and memory requirements by use of extenders instead of full access points;

Reduced code duplication;

Offload of upper MAC functions and management to the Gateway;

Simplified and/or optimized management by having a single management entity in the AC;

Simplify security management to the AC, so that security parameters need not be propagated over the network for each WTP;

Optimize bandwidth and channel usage by WTPs;

Seamless handover without requiring re-association and/or re-authentication between WTPs; and Seamless operation over hybrid backbones;

It is to be noted that other advantages may also be derived. Likewise, in some systems some of these listed advantages may not be obtained.

As may also be used herein, the terms "processor", "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processor, processing module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. The baseband module or processor, or the DSP, described herein may be regarded as a processor under these terms.

The invention has also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the invention have been expressly described herein, other combinations of these features and functions are likewise possible. The invention is not limited by the particular examples disclosed herein and expressly incorporates these other combinations.

I claim:

1. A system comprising:

a controller configured with a coaxial cable to operate as an access point for transmission and reception of wireless signals with one or more station devices at selected points along the coaxial cable; and a plurality of extender devices, having wireless communication circuitry, distributed along the coaxial cable at the selected points along the coaxial cable, in which the plurality of extender devices communicate with the controller and operate under management control of the controller to provide wireless termination point connections at the selected points along the coaxial cable for the controller to communicate wirelessly with the one or more station devices and in which communication links between the one or more station devices and one or more extender devices of the plurality of extender devices, use a Media Access Control (MAC) address of the controller for the one or more station devices to communicate with the controller, wherein the controller and plurality of extender devices are configured to support a split mode of operation in which MAC layer operations are divided between the plurality of extender devices and the controller.

2. The system of claim 1, wherein the controller and the plurality of extender devices transfer multimedia data on the coaxial cable using a multimedia standard.

3. The system of claim 1, wherein the controller and the plurality of extender devices transfer multimedia data on the coaxial cable using a MoCA specified standard.

4. The system of claim 3, wherein the multimedia data transfer between the controller and the plurality of extender devices uses Lightweight Access Point Protocol (LWAPP).

5. The system of claim 3, wherein the multimedia data transfer between the controller and the plurality of extender devices uses Control and Provisioning of Wireless Access Point Protocol (CAPWAP).

6. The system of claim 3, wherein the coaxial cable is part of a home network.

7. An apparatus comprising:

an access point controller for configuring with a coaxial cable backbone to operate as an access point for transmission and reception of wireless signals with one or more station devices at selected points along the coaxial cable backbone, in which a plurality of wireless termination point devices, having wireless communication circuitry, are distributed along the coaxial cable backbone to communicate with the access point controller and operate under management control of the access point controller to provide wireless termination point connections at the selected points along the coaxial cable backbone to communicate wirelessly with the one or more station devices and in which communication links between the one or more station devices and one or more wireless termination point devices of the plurality of wireless termination point devices, use a Media Access Control address of the access point controller for the one or more station devices to communicate with the access point controller; and an interface to link the access point controller to a data source to obtain data for transmission on the coaxial cable backbone to transmit the data from the access point controller to the station device, via the one or more wireless termination point devices, wherein the access point controller and the plurality of wireless termination point devices are configured to support a split mode of operation in which Media Access Control (MAC) layer operations are divided between the access point controller and the plurality of wireless termination point devices.

8. The apparatus of claim 7, wherein the access point controller and the plurality of wireless termination point devices are configured to transfer multimedia data on the coaxial cable backbone using a multimedia standard.

9. The apparatus of claim 7, wherein the access point controller and the plurality of wireless termination point devices are configured to transfer multimedia data on the coaxial cable backbone using a MoCA specified standard.

10. The apparatus of claim 9, wherein the multimedia data transfer between the access point controller and the plurality of wireless termination point devices is configured to use Lightweight Access Point Protocol (LWAPP).

11. The apparatus of claim 9, wherein the multimedia data transfer between the access point controller and the plurality of wireless termination point devices is configured to use Control and Provisioning of Wireless Access Point Protocol (CAPWAP).

12. The apparatus of claim 9, wherein the access point controller is configured to control timing of beacons transmitted from the plurality of wireless termination point devices.

13. The apparatus of claim 9, wherein the coaxial cable backbone is part of a home network.

14. An apparatus comprising:

a wireless termination point device for configuring with a coaxial cable backbone to operate as a wireless transmission and reception point along the coaxial cable backbone for an access point controller also on the coaxial cable backbone, the wireless termination point device to communicate with the access point controller and to operate under management control of the access point controller for the access point controller to communicate wirelessly with a station device via the wireless termination point device, wherein a communication link between the wireless termination point device and the station device uses a Media Access Control address of the access point controller; and a radio configured to provide a wireless communication link to communicate with the station device in proximity to the wireless termination point device, wherein the access point controller and the wireless termination point device are configured to support a split mode of operation in which Media Access Control (MAC) layer operations are divided between the access point controller and the wireless termination point device.

15. The apparatus of claim 14, wherein the access point controller and the wireless termination point device of the apparatus are configured to transfer multimedia data on the coaxial cable backbone using a multimedia standard.

16. The apparatus of claim 14, wherein the access point controller and the wireless termination point device of the apparatus are configured to transfer multimedia data on the coaxial cable backbone using a MoCA specified standard.

17. The apparatus of claim 16, wherein the multimedia data transfer between the access point controller and the wireless termination point device of the apparatus is configured to use Lightweight Access Point Protocol (LWAPP).

18. The apparatus of claim 16, wherein the multimedia data transfer between the access point controller and the wireless termination point device of the apparatus is configured to use Control and Provisioning of Wireless Access Point Protocol (CAPWAP).

19. The apparatus of claim 16, wherein beacons transmitted from the wireless termination point device is under control of the access point controller.

20. The apparatus of claim 16, wherein the coaxial cable backbone is part of a home network.

* * * * *